Feb. 8, 1949.  J. G. DAHLEM  2,461,312
HOSE FITTING MECHANISM
Filed March 21, 1946  3 Sheets-Sheet 1

INVENTOR.
J. Gordon Dahlem,
BY

Feb. 8, 1949.    J. G. DAHLEM    2,461,312
HOSE FITTING MECHANISM
Filed March 21, 1946    3 Sheets-Sheet 2

INVENTOR.
J. Gordon Dahlem,

Patented Feb. 8, 1949

2,461,312

UNITED STATES PATENT OFFICE 2,461,312

HOSE FITTING MECHANISM

J. Gordon Dahlem, Fort Wayne, Ind., assignor to The Wayne Pump Company, Fort Wayne, Ind., a corporation of Maryland Application March 21, 1946, Serial No. 655,953

30 Claims. (Cl. 284—18)

This invention pertains to a hose coupling and more particularly to a quick disconnect coupling particularly adapted for bottom filling of a receptacle, such as the under-wing filling of an airplane.

In many instances, as for example, in the fueling of planes, it is desirable that the tanks be filled through a bottom opening instead of through a top opening by a hose with the conventional nozzle. In the case of bottom filling, it is desirable that the fill opening of the tank be closed unless the hose coupling is in operative position and liquid under pressure is being supplied, and it is necessary that no leakage occur at the hose coupling, and that the coupling be closed except when it is in coupled position and liquid is being supplied under pressure.

It is, therefore, an object of this invention to provide connecting means for filling tanks from hoses wherein the inlet of the tank and the outlet of the hose is closed except under predetermined conditions.

Another object of the invention is to provide a hose and coupling arrangement for filling receptacles wherein there is a minimum amount of entrapped liquid in the hose when the connection is made, and wherein the sealing means for the hose and coupling is closed.

Another object of the invention is to provide a quickly detachable coupling connection between a hose and receptacle and one wherein a bottom connection can readily be made whereby the filling takes place through an opening below the liquid level.

Another object of the invention is to provide a hose fitting and tank fitting adapted to be coupled together for filling purposes wherein the fittings are incapable of being operative unless in fully coupled position.

Another object of the invention is to provide a tank fitting for a hose coupling wherein the tank fitting is provided with a valve such as a poppet type valve, so disposed that the strains or stresses in the receptacle adjacent the valve fitting are not communicated to the valve seat.

Another object of the invention is to provide hose filling mechanism adapted to be associated with a tank to be filled wherein a predetermined pressure must be built up in the hose before any liquid can be supplied to the receptacle.

Another object of the invention is to provide hose filling mechanism for a receptacle wherein a coupling is provided having a valve which must be opened before liquid can be supplied to the receptacle, and wherein, the valve having once been opened, the fitting canont be disconnected until the internal pressure is decreased to a certain value such as by stopping supply of liquid.

Another object of the invention is to provide a hose coupling through which liquid cannot be dispensed unless and until the coupling is placed in fully coupled relation to the coupling of the receptacle to be filled.

Another object of the invention is to provide coupling mechanism for receptacle filling by a hose, which mechanism cannot be disconnected during the dispensing operation, and further cannot be disconnected until the pressure in the hose is decreased to a certain predetermined value.

Another object of the invention is to provide a hose coupling adapted to be associated with a tank coupling for tank filling from the hose, wherein disconnection cannot accidentally occur as by rotation of the hose.

Another object of the invention is to provide coupling mechanism between a filling hose and a receptacle to be filled wherein the control is adjacent the hose coupling and wherein the control must be rendered inoperative before the coupling can be disconnected.

Another object of the invention is to provide coupling connecting mechanism between a filling hose and a receptacle to be filled, wherein liquid cannot be supplied through the coupling until the pressure in the hose is built up sufficiently to insure complete opening of the valves between the coupling and complete filling of the receptacle.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

The hose coupling illustrated is adapted particularly for filling receptacles through a fitting wherein the connection between the hose coupling and fitting is at a point below the bottom of the receptacle, as for example, the filling of the wing tank of a plane.

The tank 20 (Figure 10) is adapted to be grounded as at 22 and said tank is provided with the opening 24 having a coupling closure therefor indicated generally at 26. The closure comprises the closure or body member 27 (Figure 1) having a flange 28 (Figure 1) secured to the tank adjacent to the opening, and provided with the spaced inwardly directed flanges 30 and 32, flange 32 being made conveniently in the form of a threaded ring adapted to be secured by means of the threads 34. Resilient washers 36 and 38 are provided between the flanges 30 and 32 and the outwardly directed flange 40 of the seat member 42.

Figure 1:
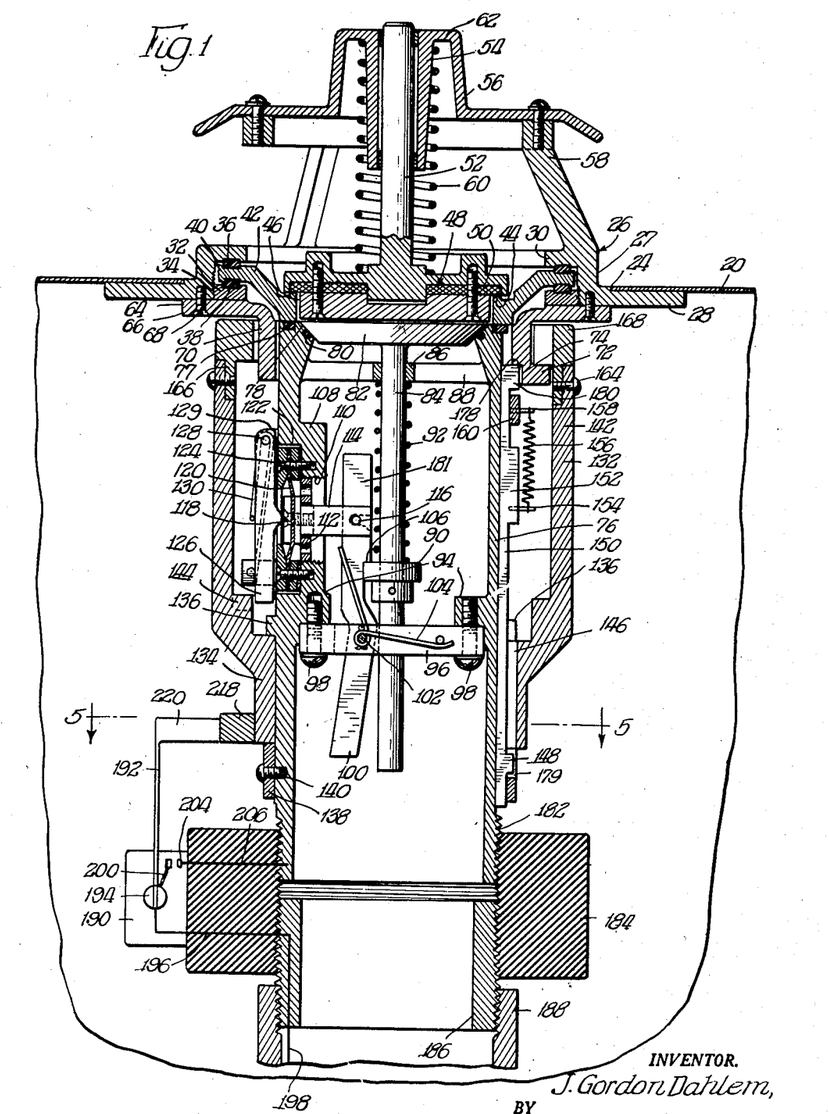
Figure 1 is a sectional elevation of a form of coupling embodying the invention, and showing hose and tank coupling members.
Figure 2:
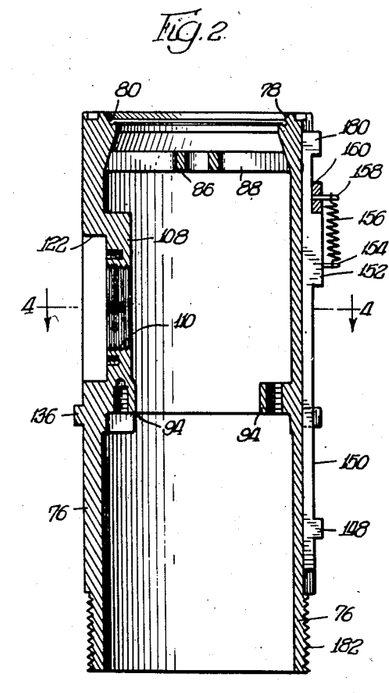
Figure 2 is a sectional elevation through a portion of the hose coupling showing the coupling key associated therewith.
Figure 3:
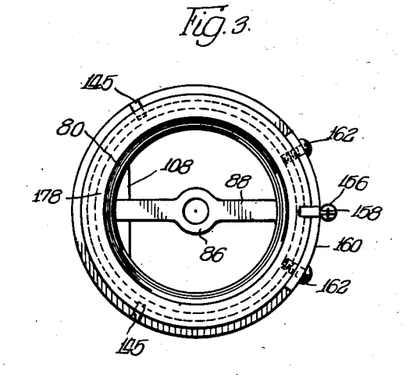
Figure 3 is a top plan view of the coupling member illustrated in Figure 2.
Figure 4:
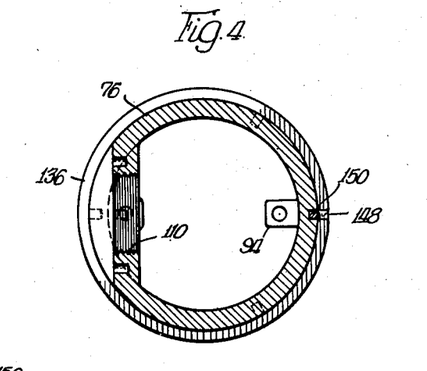
Figure 4 is a sectional plan view taken substantially in the plane as indicated by the line 4—4 of Figure 2.
Figure 5:
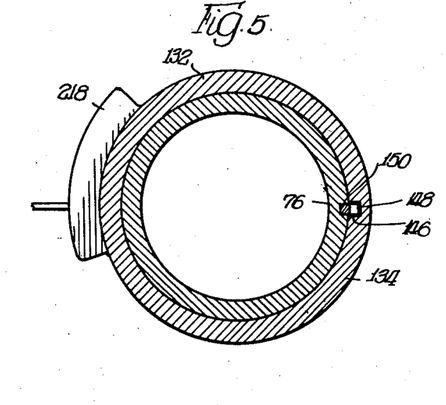
Figure 5 is a sectional plan view taken substantially in the plane as indicated by the line 5—5 of Figure 1.

The seat member 42 is dished and provided with the valve seat 44 adjacent to the valve opening 46. Valve 48, preferably provided with the resilient disk 50, is adapted to seat on valve seat 44, valve 48 being provided with the stem 52 extending upwardly for sliding co-operation with the stem guide 54 of the deflecting cap 56. The deflecting cap 56 is supported by means of the arms 58 provided on the member 26 and the spring 60, interposed between the seat 62 of the cap and the valve 48, urges the valve toward closed position.

Figure 8:
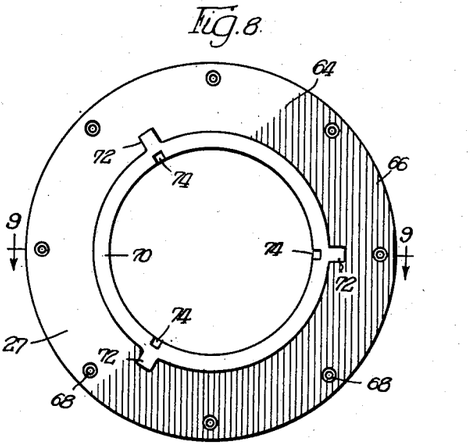
Figure 8 is a bottom plan view of the tank hose coupling adaptor for the coupling assembly illustrated in Figure 1.
Figure 9:
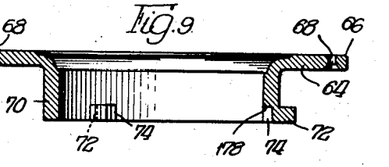
Figure 9 is a sectional elevation taken substantially in the plane as indicated by the line 9—9 of Figure 8.

Coupling closure 26 is provided with the hose coupling adaptor 64 (Figures 1, 8 and 9), said adaptor being provided with a horizontal flange 66 secured as at 68 to member 27, and is provided with the annular depending flange 70 provided with the spaced lugs 72 shown three (3) in number, the flange adjacent said lugs being provided with key recesses 74.

The hose coupling is provided with the inner relatively stationary, tubular coupling member 76 (Figs. 1 to 5 inclusive) provided, adjacent the top thereof, with the resilient packing or sealing gasket 77 for making a tight joint when the member 76 engages member 42 when the coupling is completed. The member 76 is also provided, adjacent its top thereof, with the valve seat 78 which may be provided with the resilient seating member or packing 80 for the valve 82, the valve being provided with a stem 84 extending through the bushing 86 of the spider 88 and provided with the spring seat and latch member 90. The spring 92 is seated at its upper end on the bushing 86 and at its lower end on the seat member 90.

Member 76 is provided with lugs or shoulders 94 to which the latch supporting member 96 is secured as at 98. Latch member 100 is pivoted as at 102 to the member 96, the spring 104 urging the latching shoulder 106 toward latching position with respect to the latch member 90, as illustrated in Figure 1. Member 76 is provided with a boss 108 threaded as at 110 for the reception of the pressure spider 112 through which the arm 114 extends, said arm being pivoted as at 116 to the latch member 100. The arm is secured as at 118 to the pressure responsive diaphragm 120, said diaphragm being secured in the recess 122 of the boss 108 as at 124. The latch lever 126 is pivoted as at 128 to a suitable pedestal 129 provided adjacent the boss 108, and a spring 130 urges said lever 126 toward the diaphragm. In other words, spring 130 urges lever 126 in a counter-clockwise direction about its pivot as viewed in Figure 1.

An outer rotatable tubular coupling sleeve 132 is provided with a bearing portion 134 mounted between the shoulder 136 of the member 76 and the removable retaining ring 138 secured as at 140 to the member 76. Sleeve 132 is provided with the enlarged upper portion 142 provided with a slot 144 which is of such size as to receive the adjacent free end of the lever 126. When the slot is in registry with the free end and the lever is moved in a clockwise direction as viewed in Figure 1, as by pressure on the diaphragm 120, the lever moves against spring 130 and the shoulder 106 is moved away from member 90. The sleeve is provided with lugs 145 (Figure 3) which are adapted to be received in slots 74 (Figure 8) for preventing rotation of member 76, when in coupled position, so that movements of the hose are not transmitted to the sealing gasket 77 or to the sleeve 132.

The sleeve is also provided with the slot 146 permitting sliding movement of the lug 148 of the coupling key 150. Coupling key 150 is provided with the lug 152 having a pin 154 therein to which the lower end of the spring 156 is secured, the upper end of the spring being secured to the pin 158 provided on the key retaining bar 160 secured as at 162 to the member 76.

Figure 6:
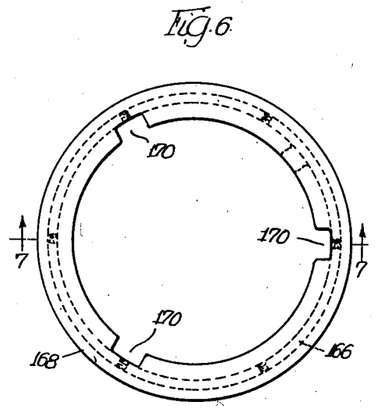
Figure 6 is a top plan view of the hose coupling sleeve head for the coupling assembly illustrated in Figure 1.
Figure 7:
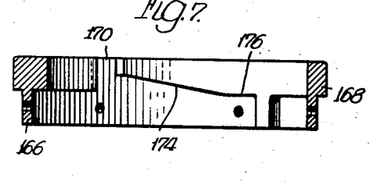
Figure 7 is a sectional elevation taken substantially in the plane as indicated by the line 7—7 of Figure 6 showing one of the cam surfaces thereof.

The upper end of the portion 142 of the sleeve 132 is secured as at 164 to the depending flange 166 of the hose coupling sleeve head 168 (Figures 6 and 7). The head 168 is provided with notches 170 (Figures 6 and 7), shown three in number, and disposed to permit passage therethrough of lugs 72. Cam surfaces 174 extend from the openings 170 and terminate in locking faces 176. Thus it will be seen that when lugs 72 are passed through openings 170 and the sleeve 132 is rotated, the lugs 72 will travel down the cam surfaces 174 to the locking surfaces 176, in which position the coupling is in fully locked position.

When the lugs 72 are passing through openings 170, shoulder 178 of the adaptor 64 will engage the head lug 180 of the coupling key to depress the coupling key, whereby lug 148 leaves slot 146 entering slot 179 of ring 138 to permit rotation of the sleeve 132 to the position where the lugs 72 engage the locking surface 176. In this position the valves 82 and 48 are closely adjacent to each other. Fluid under pressure then being supplied within the member 76 acts on the valve disk 82, which, however, is prevented from being opened by means of engagement between the shoulder 106 and the latch member 90 until such time as the pressure on the diaphragm 120 is sufficient to urge the diaphragm toward the left as viewed in Figure 1 which is permitted as recess 144 is in alignment with the end of the lever 126. The diaphragm 120 will move the latch in a counter-clockwise direction about its pivot 102 until the locking member 90 is free of the shoulder 106 at which time the fluid pressure opens the valves 82 and 48 to permit the fluid to flow into the receptacle, the fluid being deflected by means of the cap 56. When the fluid pressure is decreased to a predetermined value, springs 130 and 104 will urge latch member 100 in a clockwise direction, and springs 60 and 92 will urge the valves to closed position permitting latching engagement between shoulder 106 and the latch member 90. The upper extension 181 of latch 100 will permit easy sliding movement of latch member 90 until it reaches latching position. And with this construction the valves may be opened until the internal pressure in the hose drops to a certain value. As the latch member 100 is moving to latching position, the lever 126 is removed from recess 144, and when the valves are closed the coupling member 132 may be rotated to release it from operative position.

The end of the member 76 is threaded as at 182 and may be secured to the insulating block 184 which in turn is threaded and connected through collar 186 to the fitting or coupling 188 to which the hose is suitably secured.

A switch 190 provided with the operating member 192 is provided at 194 and electrically connected at 196 to the ground as through the static wire 198 (Figures 1 and 10) of the hose. The switch arm 200 is adapted to engage the contact 204 to close the circuit. contact 204 being electrically connected through the conductor 206 to member 76.

Figure 10:
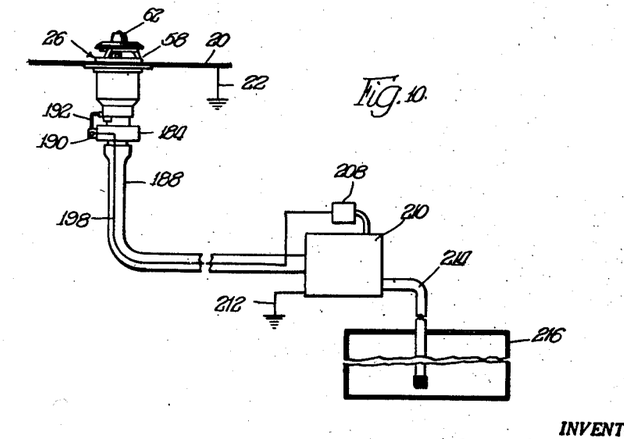
Figure 10 is a diagrammatic view showing the circuiting for the nozzle end control of the dispensing mechanism adapted to be associated with the hose coupling illustrated in Figure 1.

Referring to Figure 10, it will be seen that the switch 190 is shown as connected through the static wire 198 to control mechanism 208 which may be electronic control mechanism, such as illustrated in application Serial No. 691,212, filed August 17, 1946, Hinds and Dahlem, for Airport fueling mechanism, the control mechanism serving to control the operation of pumping equipment 210 such as shown in said application Serial No. 691,212, a ground 212 being provided for the control mechanism. The pumping equipment is connected through the inlet pipe 214 to a suitable source of supply 216. When the sleeve 132 is coupled as shown in Figure 1, contact 204 is connected electrically to the tank 20 which is grounded as at 22. Thus a circuit may be completed by operating the switch at the nozzle which will serve to control the control mechanism 208 whereupon the pumping equipment serves to dispense from the tank 216. When the nozzle is disconnected from the tank, the circuit cannot be completed unless the nozzle is otherwise grounded.

In order to provide a proper interlock to prevent dispensing unless the hose coupling is coupled to the tank coupling, the portion 134 is provided with the lug 218 (Figures 1 and 5) which is adapted to be disposed in the way of the lug 220 provided on the switch 192, whereby the lug 218 prevents the arm 200 from engaging contact 204 until and unless the sleeve 132 is rotated to fully engaged position, whereupon the lug 218 will be moved out of the path of lug 220, and lugs 72 are in engagement with surfaces 176. Also, it will be seen that it is impossible to disconnect sleeve 132 from adaptor 70 so long as the switch is closed as the lug 220 will be disposed in the path of rotation of the lug 218. Thus accidental operation and disconnection cannot occur.

It is to be understood that this application is not to be limited by the exact embodiments of the device shown, which are merely by way of illustration and limitation, as various and other forms of the device will, of course, be apparent to those skilled in the art without departing from the spirit of the invention or the scope of the claims.

I claim:

1. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, a latch member between said coupling member and sleeve for fixing said sleeve against rotation, said latch member being movable to inoperative position when said sleeve is to be rotated to a predetermined position, and means on said sleeve for preventing movement of the pressure responsive means and thus unlocking of the latch until said sleeve is moved to said predetermined position.

2. A fill opening fitting for a receptacle, the fitting comprising a body member provided with a securing flange for attachment to the receptacle, spaced arms extending from said body portion, a deflecting cap secured to said arms and having a spring seat and valve stem guide, said body member having spaced annular flanges extending inwardly, a valve seat member resiliently supported between said flanges and having a valve seat, a valve adapted to move to seated and unseated positions with respect to said seat, resilient means between said valve and first named seat for urging said valve to closed position, said valve having a stem slidably disposed in said stem guide, and a coupling member secured to said body member having a depending circular flange provided with spaced radial locking lugs and latch receiving recesses terminating in a latch engaging shoulder.

3. In a coupling for connecting a hose to a receptacle to be filled therefrom, the combination of a fill opening fitting for a receptacle comprising a body member provided with a securing flange for attachment to the receptacle, spaced arms extending from said body portion, a deflecting cap secured to said arms and having a spring seat and valve stem guide, said body member having spaced annular flanges extending inwardly, a valve seat member resiliently supported between said flanges and having a valve seat, a valve adapted to move to seated and unseated positions with respect to said seat, resilient means between said valve and first named seat for urging said valve to closed position, said valve having a stem slidably disposed in said stem guide, a coupling member secured to said body member having a depending circular flange provided with spaced radial locking lugs and latch receiving recesses terminating in a latch engaging shoulder, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, a latch member between said coupling member and sleeve for fixing said sleeve against rotation, said latch member being received in one of said recesses and being adapted to engage the latch engaging shoulder thereof whereby a predetermined relative movement of said sleeve toward the fill opening fitting moves the latch member to inoperative position to permit rotation of said sleeve to a predetermined position, means on said sleeve for preventing movement of the pressure responsive means and thus unlocking of the latch until said sleeve is moved to said predetermined position, and cam means carried by said sleeve for engaging said radial locking lugs whereby rotation of said sleeve causes a locking coupling between the hose coupling and fill opening fitting moving said sleeve toward the fill opening fitting to thereby move the latch member to inoperative position.

4. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, a latch member urged toward a position between said coupling member and sleeve for fixing said sleeve against rotation, asid latch member being movable to inoperative position when said sleeve is to be rotated to a predetermined position, means on said sleeve for preventing movement of the pressure responsive means and thus unlocking of the latch until said sleeve is moved to said predetermined position, a switch disposed on said hose coupling for controlling supply of fluid to said hose coupling, and means on said sleeve for preventing closing said switch unless the sleeve is in said predetermined position.

5. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, a latch member urged toward a position between said coupling member and sleeve for fixing said sleeve against rotation, said latch member being movable to inoperative position when said sleeve is to be rotated to a predetermined position, means on said sleeve for preventing movement of the pressure responsive means and thus unlocking of the latch until said sleeve is moved to said predetermined position, a switch disposed on said hose coupling for controlling supply of fluid to said hose coupling, and interlocking means between said switch and sleeve for preventing closing said switch unless the sleeve is in said predetermined position, and preventing movement of said sleeve from said predetermined position unless said switch is open.

6. In a coupling for connecting a hose to a receptacle to be filled therefrom, the combination of a fill opening fitting for a receptacle comprising a body member provided with a securing flange for attachment to the receptacle, spaced arms extending from said body portion, a deflecting cap secured to said arms and having a spring seat and valve stem guide, said body member having spaced annular flanges extending inwardly, a valve seat member resiliently supported between said flanges and having a valve seat, a valve adapted to move to seated and unseated positions with respect to said seat, resilient means between said valve and first named seat for urging said valve to closed position, said valve having a stem slidably disposed in said stem guide, a coupling member secured to said body member having a depending circular flange provided with spaced radial locking lugs and latch receiving recesses terminating in a latch engaging shoulder, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, a latch member between said coupling member and sleeve for fixing said sleeve against rotation, said latch member being received in one of said recesses and being adapted to engage the latch engaging shoulder thereof whereby a predetermined relative movement of said sleeve toward the fill opening fitting moves the latch member to inoperative position to permit rotation of said sleeve to a predetermined position, means on said sleeve, for preventing movement of the pressure responsive means and thus unlocking of the latch until said sleeve is moved to said predetermined position, cam means carried by said sleeve for engaging said radial locking lugs whereby rotation of said sleeve causes a locking coupling between the hose coupling and fill opening fitting moving said sleeve toward the fill opening fitting to thereby move the latch member to inoperative position, a switch disposed on said hose coupling for controlling supply of fluid to said hose coupling, and means on said sleeve for preventing closing said switch unless the sleeve is in said predetermined position.

7. In a coupling for connecting a hose to a receptacle to be filled therefrom, the combination of a fill opening fitting for a receptacle comprising a body member provided with a securing flange for attachment to the receptacle, spaced arms extending from said body portion, a deflecting cap secured to said arms and having a spring seat and valve stem guide, said body member having spaced annular flanges extending inwardly, a valve seat member resiliently supported between said flanges and having a valve seat, a valve adapted to move to seated and unseated positions with respect to said seat, resilient means between said valve and first named seat for urging said valve to closed position, said valve having a stem slidably disposed in said stem guide, a coupling member secured to said body member having a depending circular flange provided with spaced radial locking lugs and latch receiving recesses terminating in a latch engaging shoulder, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, a latch member between said coupling member and sleeve for fixing said sleeve against rotation, said latch member being received in one of said recesses and being adapted to engage the latch engaging shoulder thereof whereby a predetermined relative movement of said sleeve toward the fill opening fitting moves the latch member to inoperative position to permit rotation of said sleeve to a predetermined position, means on said sleeve for preventing movement of the pressure responsive means and thus unlocking of the latch until said sleeve is moved to said predetermined position, cam means carried by said sleeve for engaging said radial locking lugs whereby rotation of said sleeve causes a locking coupling between the hose coupling and fill opening fitting moving said sleeve toward the fill opening fitting to thereby move the latch member to inoperative position, a switch disposed on said hose coupling for controlling supply of fluid to said hose coupling, and interlocking means between said switch and sleeve for preventing closing said switch unless the sleeve is in said predetermined position and preventing movement of said sleeve from said predetermined position unless said switch is open.

8. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve being moved between uncoupled and coupled positions, and means controlled by said sleeve for preventing movement of the pressure responsive means from moving the latch to unlocked position until said sleeve is moved to coupled position whereby said valve may be opened by pressure.

9. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve being moved between uncoupled and coupled positions, means controlled by said sleeve for preventing movement of the pressure responsive means from moving the latch to unlocked position until said sleeve is moved to coupled position whereby said valve may be opened by pressure, a switch disposed on said hose coupling for controlling supply of fluid to said hose coupling, and means on said sleeve for preventing closing said switch unless the sleeve is in said predetermined position.

10. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve being moved between uncoupled and coupled positions, means controlled by said sleeve for preventing movement of the pressure responsive means from moving the latch to unlocked position until said sleeve is moved to coupled position whereby said valve may be opened by pressure, a switch disposed on said hose coupling for controlling supply of fluid to said hose coupling, and interlocking means between said switch and sleeve for preventing closing said switch unless the sleeve is in said predetermined position and preventing movement of said sleeve from said predetermined position unless said switch is open.

11. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, and means controlled by said sleeve for preventing said second named means from moving the latch to unlocked position until the sleeve is moved to coupled position whereby said valve may be opened.

12. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, a latch member urged toward a position to fix said sleeve against rotation, said latch member being movable to inoperative position to permit rotation of said sleeve to coupled position, and means controlled by said sleeve for preventing said second named means from moving the latch to unlocked position until the sleeve is moved to coupled position whereby said valve may be opened.

13. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, means controlled by said sleeve for preventing said second named means from moving the latch to unlocked position until the sleeve is moved to coupled position whereby said valve may be opened, a switch disposed on said hose coupling for controlling supply of fluid to said hose coupling, and means on said sleeve for preventing closing said switch unless the sleeve is in said predetermined position.

14. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, a latch member urged toward a position to fix said sleeve against rotation, said latch member being movable to inoperative position to permit rotation of said sleeve to coupled position, means controlled by said sleeve for preventing said second named means from moving the latch to unlocked position until the sleeve is moved to coupled position whereby said valve may be opened, a switch disposed on said hose coupling for controlling supply of fluid to said hose coupling, and means on said sleeve for preventing closing said switch unless the sleeve is in said predetermined position.

15. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, means controlled by said sleeve for preventing said second named means from moving the latch to unlocked position until the sleeve is moved to coupled position whereby said valve may be opened, a switch disposed on said hose coupling for controlling supply of fluid to said hose coupling, and interlocking means between said switch and sleeve for preventing closing said switch unless the sleeve is in said predetermined position and preventing movement of said sleeve from said predetermined position unless said switch is open.

16. In a hose coupling, the combination of a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, a latch member urged toward a position to fix said sleeve against rotation, said latch member being movable to inoperative position to permit rotation of said sleeve to coupled position, means controlled by said sleeve for preventing said second named means from moving the latch to unlocked position until the sleeve is moved to coupled position whereby said valve may be opened, a switch disposed on said hose coupling for controlling supply of fluid to said hose coupling, and interlocking means between said switch and sleeve for preventing closing said switch unless the sleeve is in said predetermined position and preventing movement of said sleeve from said predetermined position unless said switch is open.

17. A fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, and a coupling member secured to said body member and having means for engagement by means on a hose coupling whereby said fitting and hose coupling may be coupled.

18. A fill opening fitting for a receptacle, the fitting comprising a body member provided with securing means for attachment to the receptacle, a deflecting cap supported in spaced relation to the body member, said body member having spaced annular flanges extending inwardly, a valve seat member resiliently supported between said flanges and having a valve seat, a valve adapted to move to seated and unseated positions with respect to said seat, resilient means between the valve and cap for urging said valve to closed position, and a coupling member secured to said body member.

19. In a coupling for connecting a hose to a receptacle to be filled therefrom, the combination of a fill opening fitting for a receptacle, the fitting comprising a body member provided with securing means for attachment to the receptatcle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve having coupling means engagable with said first named coupling means, said coupling sleeve being moved between uncoupled and coupled positions, and means controlled by said sleeve for preventing said pressure responsive means from moving the latch to unlocked position until said sleeve is moved to coupled position whereby said valve may be opened by pressure.

20. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve being moved between uncoupled and coupled positions, means controlled by said sleeve preventing said pressure responsive means from moving the latch to unlocked position until said sleeve is moved to coupled position whereby said valve may be opened by pressure, and coupling means controlled by said sleeve for engaging the first named coupling means whereby rotation of said sleeve causes a locking coupling between the hose coupling and fill opening fitting moving said sleeve toward the fill opening fitting to thereby move the latch member to inoperative position.

21. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, means controlled by said sleeve preventing the latch moving means from moving the latch to unlocked position until the sleeve is moved to coupled position whereby said valve may be opened, and coupling means controlled by said sleeve for engaging the first named coupling means whereby rotation of said sleeve causes a locking coupling between the hose coupling and fill opening fitting.

22. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, a latch member urged toward a position to fix said sleeve against rotation, said latch member being movable to inoperative position to permit rotation of said sleeve to coupled position, means controlled by said sleeve preventing the latch moving means from moving the latch to unlocked position until the sleeve is moved to coupled position whereby said valve may be opened, and coupling means controlled by said sleeve for engaging the first named coupling means whereby rotation of said sleeve causes a locking coupling between the hose coupling and fill opening fitting moving said sleeve toward the fill opening fitting to thereby move the latch member to inoperative position.

23. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve having coupling means engageable with said first named coupling means, said coupling sleeve being moved between uncoupled and coupled positions, means controlled by said sleeve preventing said pressure responsive means from moving the latch to unlocked position until said sleeve is moved to coupled position whereby said valve may be opened by pressure, a switch disposed on said hose coupling for controlling supply of fluid to said hose coupling, and means on said sleeve for preventing closing said switch unless the sleeve is in said predetermined position.

24. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve being moved between uncoupled and coupled positions, means controlled by said sleeve preventing said pressure responsive means from moving the latch to unlocked position until said sleeve is moved to coupled position whereby said valve may be opened by pressure, coupling means controlled by said sleeve for engaging the first named coupling means whereby rotation of said sleeve causes a locking coupling between the hose coupling and fill opening fitting moving said sleeve toward the fill opening fitting to thereby move the latch member to inoperative position, a switch disposed on said hose coupling for controlling supply of fluid to said hose coupling, and means on said sleeve for preventing closing said switch unless the sleeve is in said predetermined position.

25. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled position, means controlled by said sleeve preventing the latch moving means from moving the latch to unlocked position until the sleeve is moved to coupled position whereby said valve may be opened, coupling means controlled by said sleeve for engaging the first named coupling means whereby rotation of said sleeve causes a locking coupling between the hose coupling and fill opening fitting, a switch disposed on said hose coupling for controlling supply of fluid to said hose coupling, and means on said sleeve for preventing closing said switch unless the sleeve is in said predetermined position.

26. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, a latch member urged toward a position to fix said sleeve against rotation, said latch member being movable to inoperative position to permit rotation of said sleeve to coupled position, means controlled by said sleeve preventing the latch moving means from moving the latch to unlocked position until the sleeve is moved to coupled position whereby said valve may be opened, coupling means controlled by said sleeve for engaging the first named coupling means whereby rotation of said sleeve causes a locking coupling between the hose coupling and fill opening fitting moving said sleeve toward the fill opening fitting to thereby move the latch member to inoperative position, a switch disposed on said hose coupling for controlling supply of fluid to said hose coupling, and means on said sleeve for preventing closing said switch unless the sleeve is in said predetermined position.

27. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve having coupling means engageable with said first named coupling means, said coupling sleeve being moved between uncoupled and coupled positions, means controlled by said sleeve preventing said pressure responsive means from moving the latch to unlocked position until said sleeve is moved to coupled position whereby said valve may be opened by pressure, a switch disposed on said hose coupling for controlling supply of fluid to said hose coupling, and interlocking means between said switch and sleeve for preventing closing said switch unless the sleeve is in said predetermined position, and preventing movement of said sleeve from said predetermined position unless said switch is open.

28. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, pressure responsive means for moving said latch to unlocked position when the pressure reaches a predetermined value, means for urging said latch toward locked position, an outer rotatable coupling sleeve rotatably mounted on said inner coupling member, said coupling sleeve being moved between uncoupled and coupled positions, means controlled by said sleeve preventing said pressure responsive means from moving the latch to unlocked position until said sleeve is moved to coupled position whereby said valve may be opened by pressure, coupling means controlled by said sleeve for engaging the first named coupling means whereby rotation of said sleeve causes a locking coupling between the hose coupling and fill opening fitting moving said sleeve toward the fill opening fitting to thereby move the latch member to inoperative position, a switch disposed on said hose coupling for controlling supply of fluid to said hose coupling, interlocking means between said switch and sleeve for preventing closing said switch unless the sleeve is in said predetermined position and preventing movement of said sleeve from said predetermined position unless said switch is open.

29. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, means controlled by said sleeve preventing the latch moving means from moving the latch to unlocked position until the sleeve is moved to coupled position whereby said valve may be opened, coupling means controlled by said sleeve for engaging the first named coupling means whereby rotation of said sleeve causes a locking coupling between the hose coupling and fill opening fitting, a switch disposed on said hose coupling for controlling supply of fluid to said hose coupling, and interlocking means between said switch and sleeve for preventing closing said switch unless the sleeve is in said predetermined position and preventing movement of said sleeve from said predetermined position unless said switch is open.

30. In a coupling for connecting a hose to a receptacle to be filled therefrom, the combination of a fill opening fitting for a receptacle, the fitting comprising a body member provided with securing means for attachment to the receptacle, said body member having spaced annular flanges extending inwardly, a valve seat member resiliently supported between said flanges and having a valve seat, a valve adapted to move to seated and unseated positions with respect to said seat, resilient means for urging said valve to closed position, a coupling member secured to said body member and having coupling means thereon, a hose coupling for connection to said fill opening fitting comprising a stationary inner coupling member having a hose connection at its inner end and a valve seat at its outer end, a valve movable to seated and unseated positions, resilient means urging said valve toward closed position, a latch for locking said valve in closed position, means for moving said latch to unlocked position, an outer rotatable coupling sleeve rotatably mounted on the inner coupling member and movable between coupled and uncoupled positions, a latch member urged toward a position to fix said sleeve against rotation, said latch member being movable to inoperative position to permit rotation of said sleeve to coupled position, means controlled by said sleeve preventing the latch moving means from moving the latch to unlocked position until the sleeve is moved to coupled position whereby said valve may be opened, coupling means controlled by said sleeve for engaging the first named coupling means whereby rotation of said sleeve causes a locking coupling between the hose coupling and fill opening fitting moving said sleeve toward the fill opening fitting to thereby move the latch member to inoperative position, a switch disposed on said hose coupling for controlling supply of fluid to said hose coupling, and interlocking means between said switch and sleeve for preventing closing said switch unless the sleeve is in said predetermined position and preventing movement of said sleeve from said predetermined position unless said switch is open.

J. GORDON DAHLEM.

REFERENCES CITED

The following references are of record in the file of this patent:

UNITED STATES PATENTS

| Number | Name | Date |
|---|---|---|
| 323,094 | Wolff | July 28, 1885 |
| 562,414 | O'Leary | June 23, 1896 |
| 2,096,444 | Arvintz | Oct. 19, 1937 |
| 2,280,350 | Pardee | Apr. 21, 1942 |
| 2,296,563 | Muller | Sept. 22, 1942 |
| 2,396,815 | Blum | Mar. 19, 1946 |